United States Patent

[11] 3,588,642

[72] Inventors John H. Fabricius
Stamford, Vt.;
John P. Maher, North Adams, Mass.
[21] Appl. No. 880,531
[22] Filed Nov. 28, 1969
[45] Patented June 28, 1971
[73] Assignee Sprague Electric Company
North Adams, Mass.

[54] VARIABLE ELECTRONIC COMPONENT
9 Claims, 5 Drawing Figs.

[52] U.S. Cl. .......... 317/249, 174/52, 338/184
[51] Int. Cl. .......... H01g 5/06
[50] Field of Search .......... 317/249, 249 (X); 174/52; 338/184

[56] References Cited
UNITED STATES PATENTS
3,209,219 8/1970 Masui .......... 317/249X

*Primary Examiner*—E. A. Goldberg
*Attorneys*—Connolly and Hutz, Vincent H. Sweeney, James Paul O'Sullivan and David R. Thornton

ABSTRACT: A rotor and stator element are disposed in a preformed casing with terminal leads of the stator extended from within the casing and along an outer wall thereof, and a cover of insulative material is joined to the casing and extended over portions of the terminals so as to sandwich them between the outer wall surface and the cover extension.

VARIABLE ELECTRONIC COMPONENT

BACKGROUND OF THE INVENTION

This invention pertains to variable electronic components and more particularly to a variable component encased within a preformed casing.

In the prior art, packaging of variable electronic components often requires expensive packaging due to the necessity of incorporating plunger type or rotary type elements in engagement with a drive element which extends from within the package. Generally, such packages take the form of preformed plastic or metal casings which require expensive assembly techniques and are subject to lead breakage and the like.

SUMMARY OF THE INVENTION

One object of this invention is to provide an inexpensive variable component.

Another object of the invention is to provide an inexpensive component package for variable components.

A further object of the invention is to provide a component package having an improved terminal lead arrangement.

A still further object of this invention is to provide a variable component requiring inexpensive assembly procedures.

In accordance with the invention, the variable electronic component comprises a stationary and a movable element disposed in operative association within a preformed housing of insulative material. A drive element is in engagement with the movable element and extended from the housing. At least one terminal lead is provided in connection to the stationary element and extended therefrom along an outer wall portion of the housing, and a preform cover of insulative material is disposed over an open end of the housing and joined thereto with part of the cover extended over the leads so as to sandwich them between the cover extension and the wall.

DESCRIPTION OF THE PREFERRED EMBODIMENT

Figures 1, 2, 3, 4, 5:
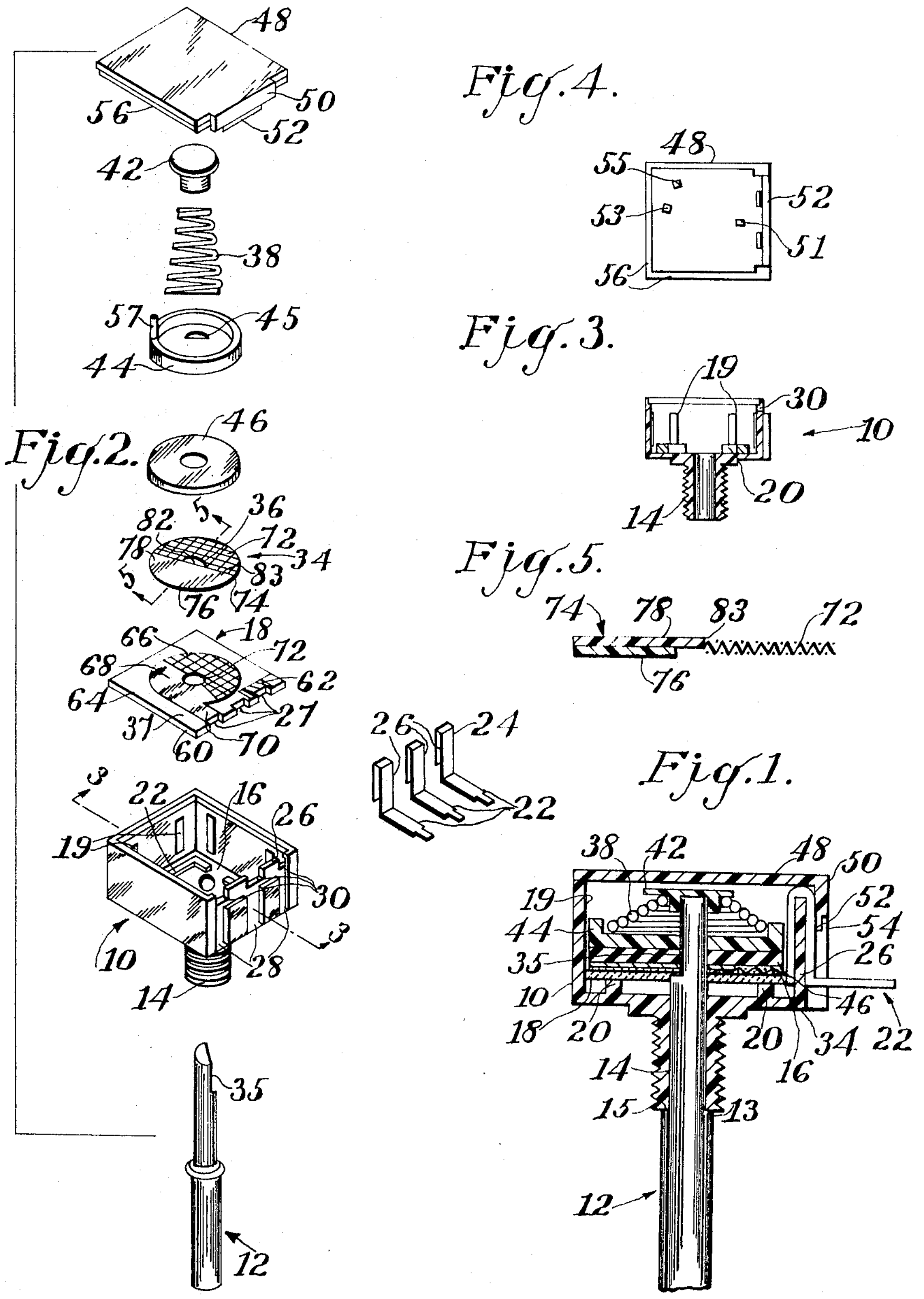
FIG. 1 is a cross section of a variable component constructed in accordance with the invention.
FIG. 2 is an exploded view of the component of FIG. 1.
FIG. 3 is a cross section of the component casing taken along the line 3–3 of FIG. 2.
FIG. 4 is a view of the underside of the cover shown in FIG. 2.
FIG. 5 is a cross section of the wiper element taken along the line 5–5 of FIG. 2.

As shown in FIGS. 1 and 2, the variable component includes a boxlike housing or casing 10 having a shaft 12 rotatably inserted in a sleeve 14 which is carried on a bottom wall 16 of casing 10. A shoulder 13 of shaft 12 is butted against the outermost end 15 of sleeve 14. A stationary element or stator 18 is disposed within casing 10 so as to be tightly fixed within vertical ribs 19 and to rest on support ribs 20, carried on the inner bottom portion of casing 10.

A plurality of terminal leads 22 extend from stator 18 to a point external of casing 10. For ease of assembly and to provide firm support, terminals 22 are formed with a folded U-shaped clamping portion 24 which engage stator 18 and a wall 26 of case 10. Stator 18 is fitted with notches or indentations 27, and wall 26 is fitted with a plurality of grooves or channels 28 and coincident edge indentations 30 designed to accommodate terminals 22.

A movable or rotor element 34 is keyed to a flattened or D-shaped portion 35 of shaft 12 by means of a generally centrally located D-shaped aperture 36. Rotor 34 is biased into tight engagement with the upper surface 37 of stator 18 by a spring 38 which is in compressed engagement between an end cap 42 of shaft 12 and a cuplike pressure plate 44. Cup 44 is also keyed to shaft 12 by means of D-shaped aperture 45. A resilient cushion 46 is disposed between cup 44 and rotor 34 to force the later into conforming contact with stator 18. Cushion 46 also makes rotor 34 track with cup 44, and hence, tends to eliminate any shaft force exerted on aperture 36 of rotor 34.

The unit is completed by a cover 48 which is joined to the open end of casing 10. Cover 48 includes an extended lip 50 which is designed to overlie a portion of terminal leads 22 and sandwich them to outer casing wall 26 as shown. The leading end of lip 50 carries a step 52 which is adapted to mate with a step 54 carried on wall 26.

As shown in FIG. 4 an additional step 56 is carried on the three remaining edges of cover 48 for ease of positioning of the cover and to enhance its sealing to casing 10. As also shown in the FIG., the underside 49 of cover 48 also carries a plurality of inwardly or downwardly depending elements or projections 51, 53 and 55. These projections or protuberances of the plastic cover are designed to operate as stops to limit the rotor and shaft rotation by engaging an upwardly extending arm or stop lug 57 of pressure cup 44. Three stops 51, 53 and 55 are provided, for versatility, although at most only two are utilized in any particular device. Hence, stops 51 and 53 are set approximately 180° apart to permit 180° rotation of rotor 34. Rotation between stops 51 to 55 permits approximately 240° rotation, and elimination of any two stops will permit approximately 340°. Any of the stops may be removed, for example by cutting it from cover 48 or by use of a temporary plug provided in forming mold, etc.

In the preferred embodiment, stator 18 is a laminated monolithic capacitor element having a first electrode of conductive material (not shown) disposed on an upper surface of a substantially flat substrate 60 of insulative material such as aluminum oxide or the like, in connection to a conductive terminal pad 62. A thin layer 64 of high dielectric constant material such as barium titanate, and a surface electrode 66 are formed or deposited over the lower electrode. Electrode 66 is an island electrode which includes a plurality of isolated conductive areas. An exposed contact area 68 and terminal pad 70 are included on the upper surface 37 adjoining island electrode 66. The electrodes, the contact area and the terminals may be of silver or the like. A centrally located aperture 72 is provided through stator 18 to allow free passage and rotation of shaft 12. Three indentations or notches 27 are provided along an edge of stator 18. These restrict lateral movement of terminals 22 where they engage stator 18.

In operation, rotor or wiper element 34 provides bridging contact between selected island areas of electrode 66 and contact area 68 to provide a capacitive variation between terminal pads 62 and 70. As shown in FIGS. 2 and 5, wiper 34 includes a semicircular annular segment of conductive material 72, such as a wire screen or the like joined to an annular segment of insulative material 74 such as a low friction plastic material or the like.

Preferably, rotor 34 is a laminated structure made from a strip conductive material 72 such as a fine wire mesh of stainless steel or bronze or the like for example, a 325 mesh having a 0.7 mil diameter wire in square weave. Mesh 72 is butted against a thin (approximately 1½ mil thick) plastic layer or film 76 of mylar or the like. A thin (approximately a 1 mil thick) low friction layer or film 78 of Teflon or the like is then bonded or cemented, by conventional means, to lower film 76, and in a slightly overlapping arrangement (for example, a 40 mil overlap) to mesh 72. Thereafter the assembly is cut or punched in a circular arrangement with a substantially centrally located D-shaped aperture 36 formed with its flat edge 82 in coincidence with the strip edge 83 of upper film 78.

In the method of assembly, shaft 12 is first inserted through sleeve 14 into the interior of casing 14. Shaft 12 is slightly enlarged in the vicinity of D-shaped portion 35 such that this area is a light press fit to sleeve 14. Hence, shaft 12 is self-retaining in casing 10. Thereafter, stator 18 is inserted within casing 10. Stator 18 is self-locking in that it is made to tightly fit (for example, a light interference fit) the square formed by vertical ribs 19, and lightly scribes or scores those ribs upon seating. Stator 18 is oriented to position its terminal pads 62 and 70 adjacent wall 26. Terminals 22 are positioned on wall 26 with the end portions within notches 27 of stator 18.

At this stage the two outermost terminals 22 are connected to terminal pads 62 and 70, respectively, by soldering or the like. For example, in the preferred embodiment, the casing 10 and shaft 12 are made of sufficiently high melting plastic as to permit dip soldering of the unit. In this embodiment, the centrally located terminal lead is not connected, however, it may be made available for a mounting lug as an alternative to threaded sleeve 14, or is available for use where different terminal arrangements or three external connections are desired.

Rotor 34, cushion 46 and cup 44 are then fitted to shaft 12 in that order with the low friction layer 78 or rotor 34 facing wafer 18. Rotor 34 and plate 44 are designed to be a slide fit for shaft 12 but are keyed to it such that they may freely move longitudinally on shaft 12 while they are angularly affixed thereto by means of the D-shaped aperture of each. Next, conical spring 38 is seated in plate 45 and compressed by cap 42 which is seated on and joined to the end of shaft 12 by any conventional means such as by ultrasonic plastic welding or the like. Shaft 12 is then rotated to place stop lug 57 of plate 44 in the proper position with respect to the stops of cover 48 which is to be disposed over casing 10.

Cover 48 is then placed on casing 10 with steps 52 and 56 interlocked therewith, and the unit is completed by joining cover 48 to casing 10 by any conventional means, for example, by ultrasonic plastic welding or the like.

For high reliability and ease of operation, casing 10 is of six-tenths nylon, cup 44 is of glass reinforced six-tenths nylon and shaft 12 is made of glass filled acetal in the preferred embodiment. This provides low static friction between shaft 12 and these mating parts. Terminal leads 22 are made of tin plated brass strips, 0.020 inch thick and 0.100 inch wide. Preferably, indents 27, 30 and grooves 28 are made to closely fit terminal leads 22.

Of course, many different materials can be utilized in this construction. The casing may also assume many different geometrical shapes such as cylindrical, etc. The terminal leads and the adjoining cover lip may be provided on more than one of the housing walls and shaft 12 may be mounted in the cover portion or other wall, rather than the housing bottom as shown. Moreover, a resistor or inductive unit or other variable component structure may also be employed for the electrical element instead of the capacitive element of the preferred embodiment.

We claim:

1. A variable component comprising a housing of insulative material, a stationary member and a movable member disposed in operative association within said housing, at least one terminal in connection to one of said members and extended therefrom, said terminal extended from said housing and alongside the outer surface of a wall thereof, a cover of insulative material disposed over an open end of said housing, said cover having a lip depending therefrom, said lip forced into engagement with said terminal to sandwich it between said lip and said wall, and a shaft in operative engagement with said movable member and extended from said housing.

2. The component of claim 1 wherein said terminal extends over at least a portion of said wall and alongside said outer surface.

3. The component of claim 2 wherein said terminals include a U-shaped portion, and said U-shaped portion having a first leg extending along the inner surface of said wall and a second leg extending along said outer surface.

4. The component of claim 2 wherein said stationary member includes an indentation, and said terminal extends within said indentation which limits lateral movement thereof.

5. The component of claim 2 wherein said casing includes a channel on said outer surface, and said terminal extends within said channel which limits lateral movement thereof.

6. The component of claim 5 wherein said stationary member is a stator which is keyed to said housing, said movable member is a rotor, said shaft extends through an end of said housing and through said stator to said rotor, and said rotor is keyed to said shaft and mechanically biased into engagement with said stator.

7. The component of claim 6 wherein said rotor includes an extended stop lug, and said cover includes depending stop members which are adapted to limit the rotation of said rotor.

8. The component of claim 6 wherein said housing carries spaced substantially vertical ribs on the inner walls thereof, and said stator is adapted for a substantially press fit with the area defined within said ribs that such insertion of said stator within said housing locks said stator within said ribs.

9. The component of claim 6 wherein said shaft extends through a bottom portion of said housing and includes a D-shaped portion at the inner end thereof, said rotor member includes a thin flexible conductive member which is pressed into engagement with said stator by a resilient cushion member carried on a substantially rigid pressure plate, said pressure plate carrying said extended stop lug, and said plate mechanically biased towards said stator by a spring element compressed between said plate and the inner end of said shaft so as to sandwich said stator between said rotor and said bottom portion of said housing.